(12) United States Patent
Luick et al.

(10) Patent No.: US 10,830,247 B2
(45) Date of Patent: Nov. 10, 2020

(54) REMANUFACTURED TURBOCHARGER SHAFT AND METHOD

(71) Applicant: Caterpillar Inc., Deerfield, IL (US)

(72) Inventors: Kegan Luick, Dunlap, IL (US); Rodolfo Calvo Islas, Nuevo Laredo (MX)

(73) Assignee: Caterpillar Inc., Peoria, IL (US)

(*) Notice: Subject to any disclaimer, the term of this patent is extended or adjusted under 35 U.S.C. 154(b) by 22 days.

(21) Appl. No.: 16/104,427

(22) Filed: Aug. 17, 2018

(65) Prior Publication Data
US 2020/0056621 A1  Feb. 20, 2020

(51) Int. Cl.
*F04D 29/054* (2006.01)
*F02C 6/12* (2006.01)
*F01D 5/02* (2006.01)
*F04D 29/053* (2006.01)

(52) U.S. Cl.
CPC ........... *F04D 29/054* (2013.01); *F01D 5/025* (2013.01); *F02C 6/12* (2013.01); *F04D 29/053* (2013.01); *F05D 2220/40* (2013.01); *F05D 2230/80* (2013.01); *F05D 2240/14* (2013.01); *F05D 2240/60* (2013.01); *F16C 2226/70* (2013.01); *F16C 2237/00* (2013.01)

(58) Field of Classification Search
CPC ........ F04D 29/053; F04D 29/054; F16C 3/00; F16C 3/02; F16C 2226/70–78; F16C 2237/00; F05D 2230/80; F05D 2240/60
See application file for complete search history.

(56) References Cited

U.S. PATENT DOCUMENTS

| | | | |
|---|---|---|---|
| 4,844,322 A | 7/1989 | Flowers et al. | |
| 5,348,212 A | 9/1994 | Galanes | |
| 6,240,661 B1 | 6/2001 | Seibold | |
| 7,507,933 B2 | 3/2009 | Nolan et al. | |
| 7,934,303 B2 | 5/2011 | Awwad et al. | |
| 9,638,106 B2 | 5/2017 | Müller | |
| 9,909,559 B2 | 3/2018 | Lohan et al. | |
| 2014/0305129 A1* | 10/2014 | Keegan | F01D 25/285 60/772 |
| 2016/0032936 A1* | 2/2016 | Krejci | F04D 29/063 415/111 |
| 2016/0169056 A1 | 6/2016 | Luick et al. | |
| 2016/0319832 A1* | 11/2016 | Takahara | F04D 29/266 |

\* cited by examiner

*Primary Examiner* — Laert Dounis
(74) *Attorney, Agent, or Firm* — Leydig, Voit & Mayer, Ltd.

(57) ABSTRACT

A turbocharger includes a center housing, a turbine connected on one side of the center housing, the turbine including a turbine wheel connected to a shaft, the shaft extending through the center housing, and a compressor connected on an opposite side of the center housing, the compressor including a compressor wheel connected to the shaft opposite the turbine wheel. The shaft includes a cylindrical body having a centerline, a bore extending into the body adjacent the compressor wheel, and a stublet having an internal end engaged in the bore, and an external end connected to the compressor wheel.

12 Claims, 7 Drawing Sheets

REMANUFACTURED TURBOCHARGER SHAFT AND METHOD

TECHNICAL FIELD

This patent disclosure relates generally to air compressors and, more particularly, to the remanufacture of air compressor shafts in turbochargers for internal combustion engines.

BACKGROUND

In conventional air compressors such as those used on internal combustion engines, engine intake air is compressed before being provided to engine cylinders. In one type of air compressors, such as those that are part of turbochargers, exhaust gas energy is used to drive a turbine, which is connected via a drive shaft to the compressor. The exhaust gas passes through a scrolled passage of the turbine and impinges onto a turbine wheel causing it to turn. The turbine wheel is connected to the shaft, which is connected to a compressor wheel disposed in a compressor housing. The powered rotation of the turbine wheel and shaft operate to turn the compressor wheel, which draws air into a compressor housing having a scrolled shape and compresses it.

It is often the case that turbochargers can be remanufactured to extend their useful life. When remanufacturing a turbocharger, an old unit is typically disassembled so its internal structures can be cleaned, reconditioned or replaced. Regarding the turbocharger shaft specifically, a threaded end onto which the compressor wheel is attached may become damaged or bent, which up to now requires replacement of the entire turbocharger shaft, which is often sourced with a turbine wheel attached.

SUMMARY

In one aspect, the disclosure describes a turbocharger. The turbocharger includes a center housing, a turbine connected on one side of the center housing, the turbine including a turbine wheel connected to a shaft, the shaft extending through the center housing. The turbocharger further includes a compressor connected on an opposite side of the center housing, the compressor including a compressor wheel connected to the shaft opposite the turbine wheel. The shaft includes a cylindrical body having a centerline, a bore extending into the body adjacent the compressor wheel, and a stublet having an internal end engaged in the bore, and an external end connected to the compressor wheel.

In another aspect, the disclosure describes a method for remanufacturing a shaft for a turbocharger. The method includes providing a turbocharger shaft having a damaged end, severing the damaged end of the turbocharger shaft, drilling a bore into a body of the turbocharger shaft along a centerline thereof from damaged end, providing a stublet having an internal end and an external end, and mounting the internal end of the stublet into the bore, and securing the internal end of the stublet to the shaft. The external end of the stublet forms features that recreate features original present on the damaged end of the turbocharger shaft.

In yet another aspect, the disclosure describes a turbocharger shaft that includes a body having an elongate shape and a centerline, the shaft having a turbine end and a compressor end, the compressor end forming a protrusion from an end of the body. The protrusion is formed on an end of stublet having an internal part and an external part, the external part forming the protrusion and including a bearing portion, a threaded portion and a pilot portion. An internal part extends into a bore formed in the body and engages the body via a threaded connection provided in the bore. The stublet further includes a tapered portion disposed between the internal and external parts, the tapered portion positioned within an end of the bore, the tapered portion having a smaller diameter disposed adjacent the internal part and a larger diameter disposed adjacent the external part and axially positioned within a bore opening disposed at an end of the body.

DETAILED DESCRIPTION

This disclosure relates to air compressors and, specifically, to structures and methods used to rebuild or remanufacture a compressor shaft such as a turbocharger shaft. In one embodiment, the compressor is a mechanically or turbine driven air compressor in an internal combustion engine. The disclosed compressor embodiments have a typical construction that includes a compressor wheel having generally radially extending vanes that operate within a scroll-shaped operating chamber formed within a compressor housing. The compressor wheel is connected to the shaft, which rotates under power provided by a turbine or other mechanical or electrical means. The compressor wheel rotates within a housing having a scrolled passage extending therethrough such that air entering the compressor housing via a central passage is radially directed into the scrolled housing, which increases the speed, pressure and temperature of the air. The shaft extends through a center housing in which oil is provided for operation, lubrication, cooling and/or for other reasons. In the disclosed embodiments, an end of the shaft onto which the compressor wheel is connected may become damaged. Instead of incurring the cost of replacing the entire shaft when rebuilding the compressor, the shaft is repaired by removing the damaged portions and replacing a portion of the shaft. The embodiments disclosed herein relate to compressors that are arranged with a turbine on an internal combustion engine, but should not be considered as limited to the structure or application of the compressor structures and methods described herein.

Figure 1:
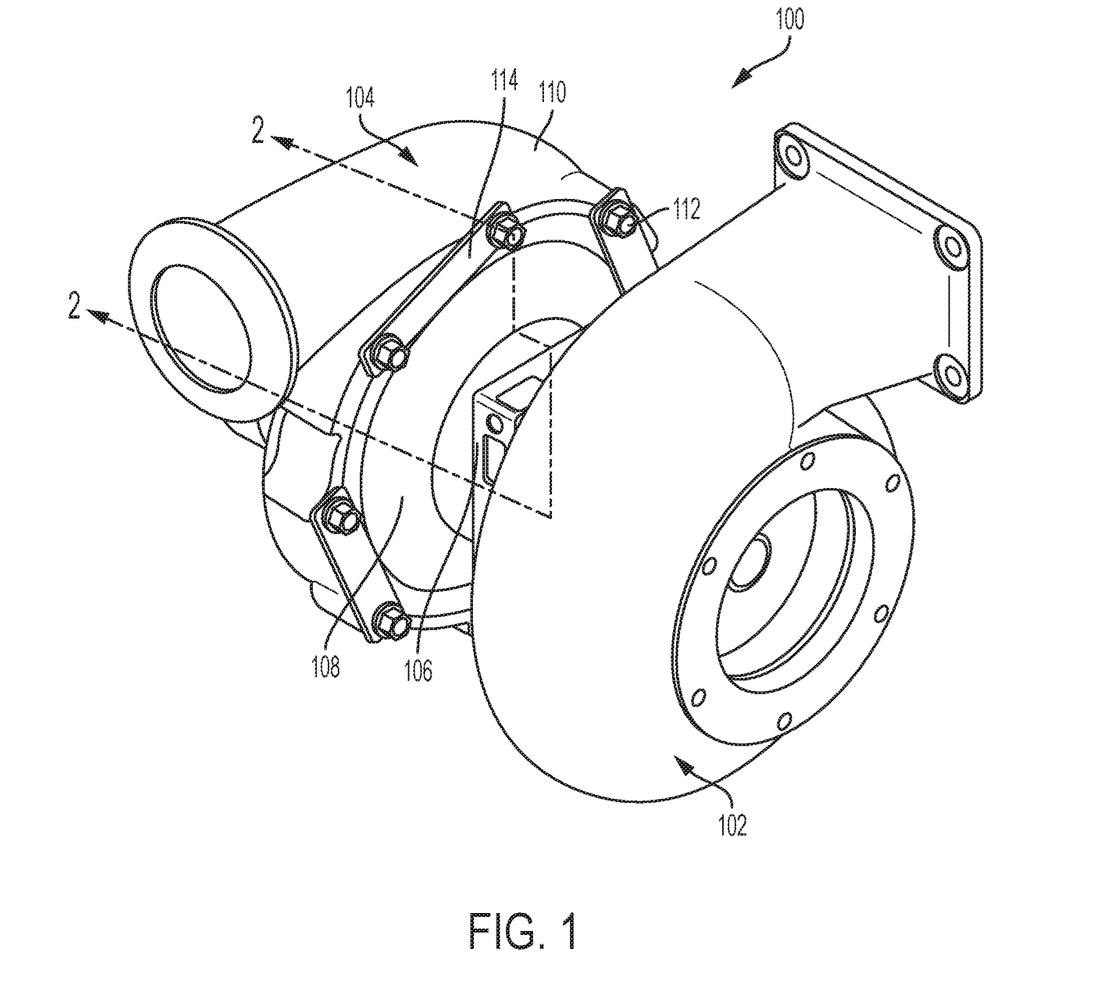
FIG. 1 is an outline view of a turbocharger in accordance with the disclosure.

An outline view of a turbocharger 100 is shown in FIG. 1. The turbocharger 100 includes a turbine 102 and a compressor 104. The turbine 102 and compressor 104 are both connected to a center housing 106. In the illustrated embodiment, the compressor 104 includes a compressor housing 110 connected to the center housing 106 via a back-plate 108. The back-plate 108, which is generally disc-shaped, can be connected to the compressor housing 110 using any known arrangement. In the illustrated embodiment, the connection arrangement between the back-plate 108 and the compressor housing 110 includes bolts 112 cooperating with plates 114 to retain the back-plate 108 within a rim surrounding a bore formed in the compressor housing 110. Alternatively, another mounting arrangement such as a clamp may be used to retain the compressor housing 110 onto the back-plate 108. The compressor further includes a compressor wheel 116 housed within the compressor housing 110 in the known fashion. The compressor wheel 116 is not visible in FIG. 1 but is partially illustrated in the fragmentary views of FIG. 2.

Figure 2:
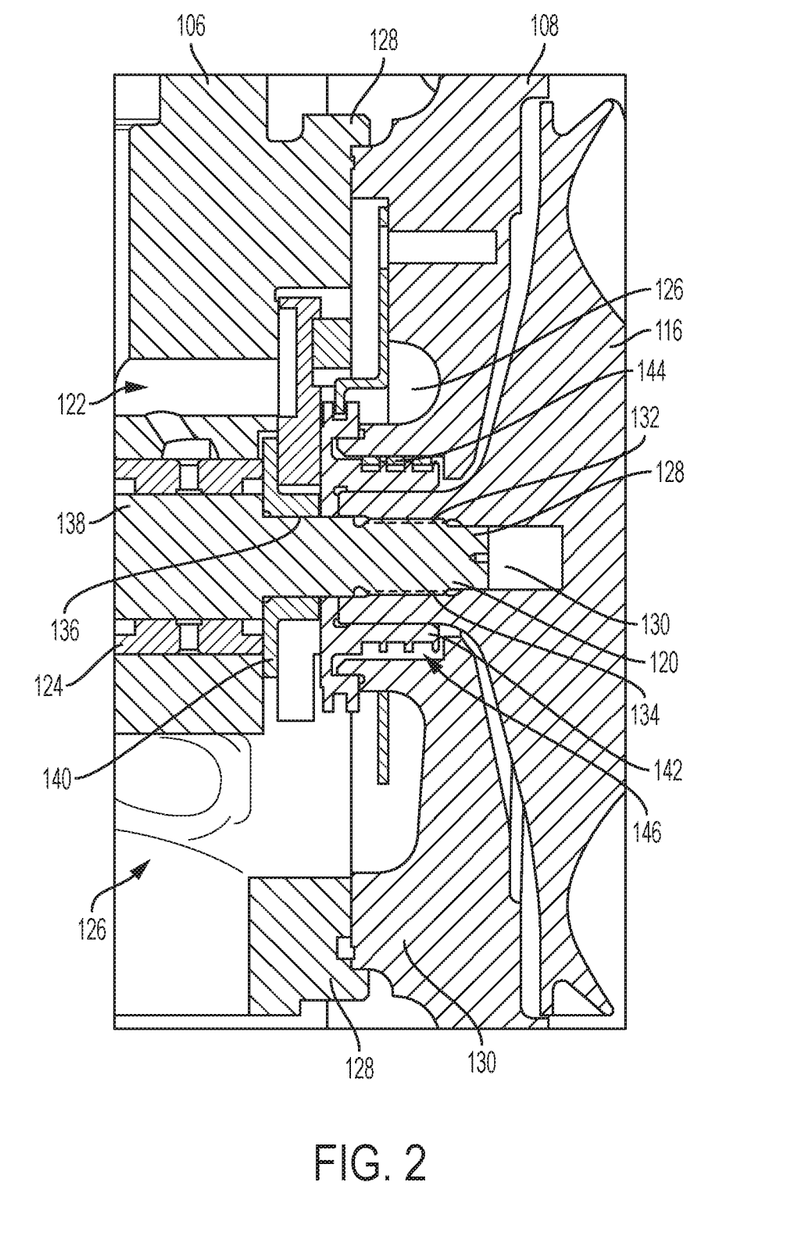
FIG. 2 is a partial, fragmented view of a portion of the compressor of the turbocharger shown in FIG. 1.

As shown in FIG. 2, the compressor wheel 116 is connected at the end of a shaft 120, which extends through the center housing 106 and includes a turbine wheel (not shown) on its opposite end, as previously described. The shaft 120 rotates during operation of the compressor. The shaft 120, on its compressor wheel end shown in FIG. 2, includes a pilot diameter 128, the diameter of which is controlled to provide a close fit with a pilot bore 130 of the compressor wheel. The close fit between the pilot diameter 128 and the pilot bore 130 of the compressor wheel 116 helps align the compressor wheel with the shaft during installation.

Adjacent the pilot diameter 128, the shaft 120 includes a threaded portion 132, which threadably engages a threaded opening 134 of the compressor wheel 116. The threaded engagement between the threaded portion 132 and the threaded opening 134 retains and secures the compressor wheel 116 onto the end of the shaft 120. The shaft further includes a bearing portion 136, which is connected to a main body 138 of the shaft 120.

The center housing 106 includes oil passages 122 that provide oil to bearings or bushings 124 arranged to rotatably support the shaft 120 within a bore of the center housing 106. Oil from the passages 122 washes over the bushings 124 and collects in a gallery 126 formed within the center housing 106, from where it is evacuated back to the engine in a typical fashion, for example, by gravity.

To prevent oil from leaking from the passages 122 and gallery 126, the turbocharger includes a thrust collar retainer 140, which also acts as a cap that blocks off an open end of the passages 122. The thrust collar retainer 140 mechanically constrains an inner portion of a thrust collar 142 to remain in contact with the center housing 106. The thrust collar 142 is configured to retain the bushings 124 in place and to resist axial loading of the bushings, which may result from thrust loading transferred from the compressor and/or turbine wheels onto the shaft during operation. The inner portion of the thrust collar retainer 140 mates with an outer portion of the thrust collar 142, which is fixedly disposed onto the shaft 120 and arranged to rotate therewith. In an alternative embodiment, a single-piece thrust collar may be used, for example, where the inner and outer portions of the thrust collar retainer 140 and the thrust collar 142 together form a unitary structure. A plurality of radial seals 144 are associated with the outer portion of the thrust collar 142. The radial seals 144 sealably and rotatably engage a shaft bore 146 of the back-plate 108 through which the shaft 120 extends.

When rebuilding the turbocharger 100, the various internal components are disassembled for cleaning, reconditioning or replacement. One failure that is commonly found in internal components is a destruction and/or deformation of the various features present on the compressor wheel end of the shaft 120. Such conditions are usually addressed by replacing the shaft 120 up to now. However, the ability to rebuild or recondition a damaged shaft is advantageous in that is presents a lower cost alternative to replacing the shaft without sacrificing its form or function. As can be appreciated, a bend in the shaft can cause vibration and wear in other components such as the bushings 124. The present disclosure provides structures and methods for achieving a reconditioning or a remanufacturing of the shaft 120. It should also be appreciated that although the compressor-wheel end of the shaft is discussed in detail herein, similar structures or methods may be used to remanufacture the turbine-wheel end of the shaft.

Figure 3:
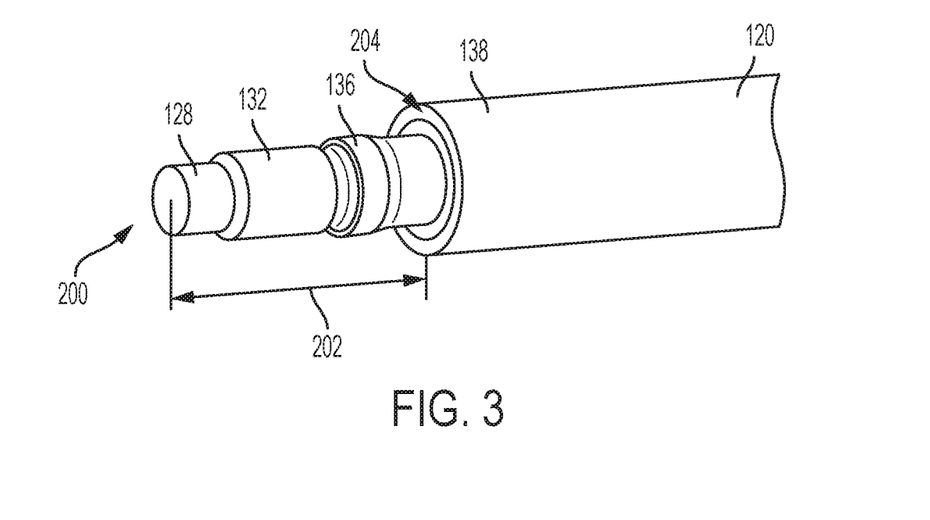
FIG. 3 is a detail view of a compressor end of a turbocharger shaft.
Figure 4:
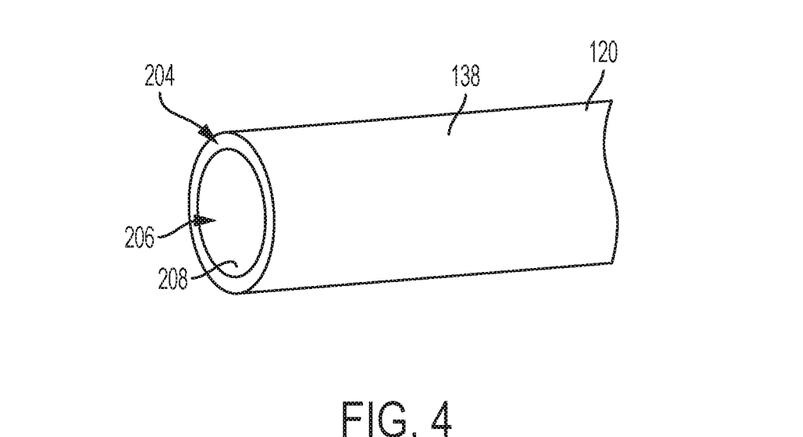
FIG. 4 is a detail view of the compressor end of the turbocharger shaft shown in FIG. 3 following a machining operation in accordance with the disclosure.

Referring now to the various views of the compressor-wheel end 200 of the shaft, as shown in FIGS. 3-9, it can be seen that the shaft 120 includes various features discussed above such as the pilot diameter 128, which guides the alignment of the shaft with the compressor wheel 116, the threaded portion 132, which threadably engages the threaded opening 134 (FIG. 2) of the compressor wheel 116, and the bearing portion 136. These features are formed on a protrusion 202 that extends past the end of the main body 138 of the shaft 120, as shown in FIG. 3.

Figure 6:
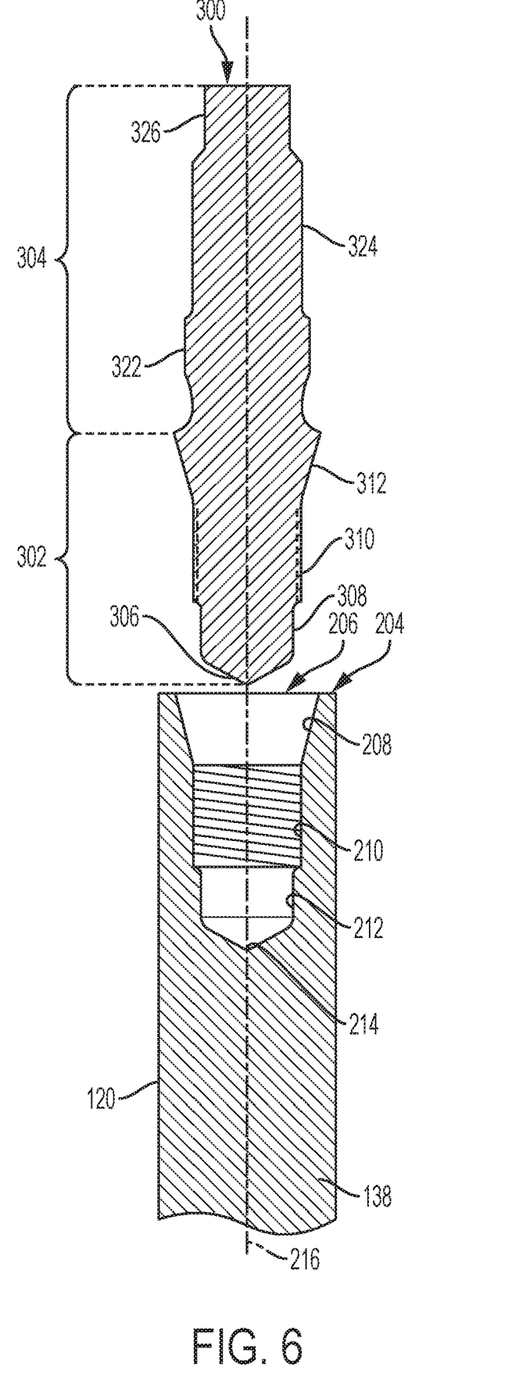
FIG. 6 is a cross section view of an end of a shaft and a threaded insert during installation in accordance with the disclosure.
Figure 7:
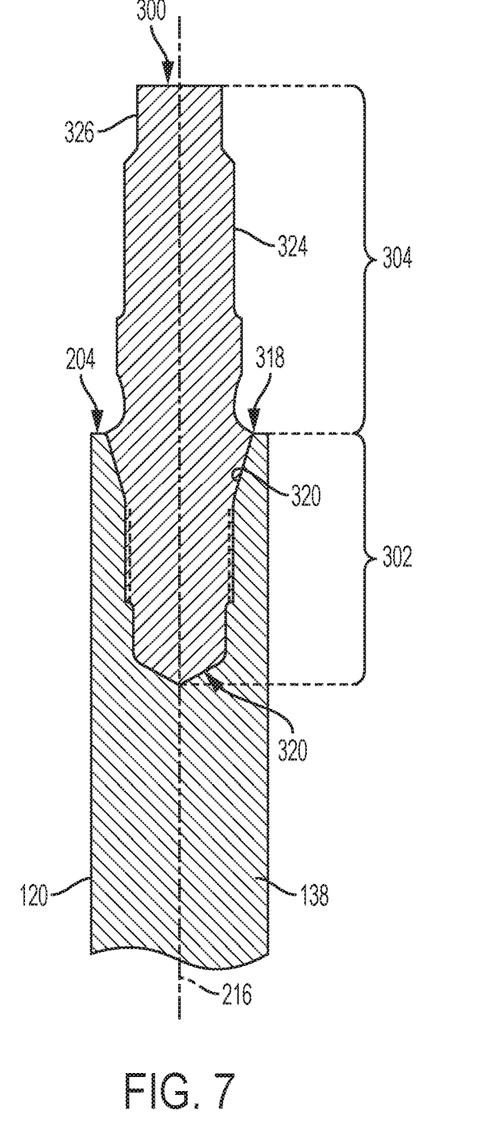
FIG. 7 is a cross section view of a threaded insert installed into and end of a shaft in accordance with the disclosure.

In a first operation for remanufacturing the shaft 120, the protrusion 202 is cut, for example, past an annular end surface 204 of the main body 138. Thereafter, a bore 206 is drilled into the main body 138. As can be seen in FIGS. 6 and 7, the bore 206 is a bore that includes a tapered entry portion 208, a threaded portion 210, an extension portion 212, and a blind end 214 in a direction moving from the annular end surface 204 towards the main body 138 along a centerline 216 of the shaft 120. Into these portions of the bore 206 a stublet preform 300 is installed, as described below.

Figure 5:
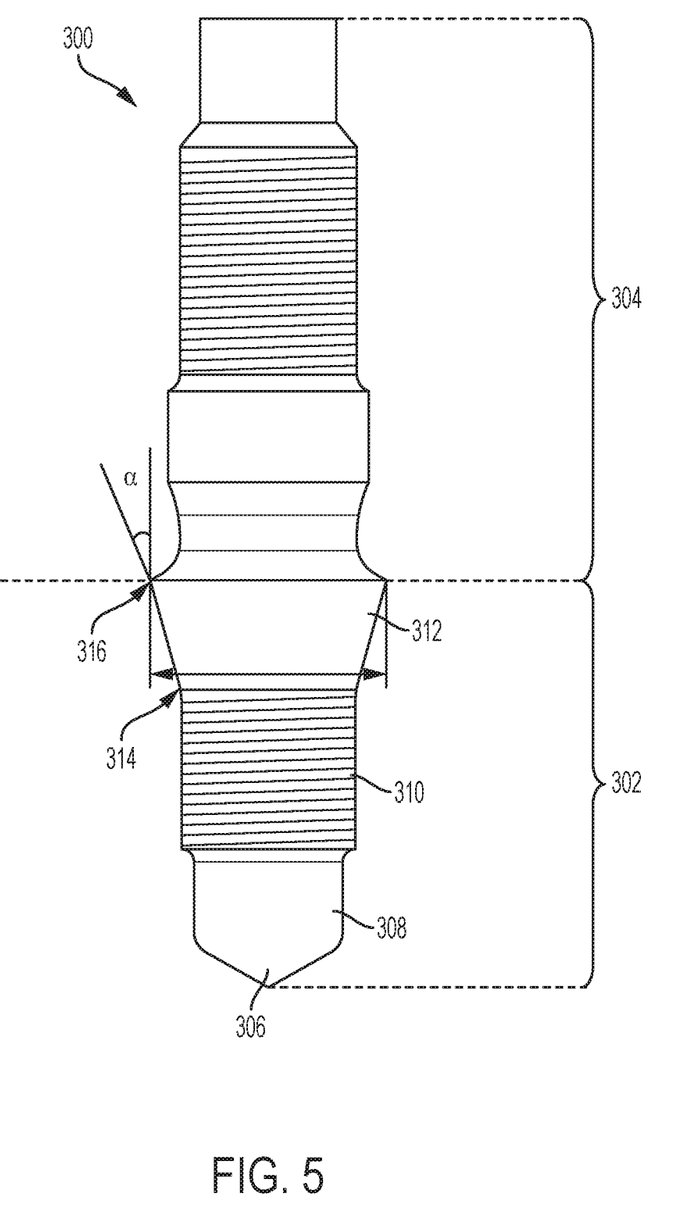
FIG. 5 is a threaded insert in accordance with the disclosure.

A side view of a stublet preform 300 is shown in FIG. 5. The stublet preform 300 has an elongate shape that is generally separated in two parts, an internal part 302 and an external part 304. As the remanufacturing of the shaft 120 progresses, the internal part 302 is generally inserted and affixed in the bore 206, while the external part 304 protrudes past the end of the main body 138 to replace or recreate the protrusion 202 (FIG. 3) and all of its features, as will be described below. In the exemplary process discussed herein, at least the external part 304 may be partially formed with certain features, which are not fully formed until after the internal part 302 has been installed onto the main body 138 and a finishing or machining process is applied to accurately position and dimension the various features and functional surfaces and dimensions of the external part 304. The installed condition of the stublet preform 300 is shown in FIG. 7.

In reference to FIGS. 5, 6 and 7, the internal part 302 includes a tip 306 having a conical shape that generally matches the shape of the blind end 214 of the bore 206. Adjacent the tip 306 is an extension 308 that, when installed in the bore 206, will occupy the extension portion 212. A threaded portion 310 is disposed adjacent the extension 308. The threaded portion 310 is arranged to threadably engage the corresponding threaded portion 210 (FIG. 6) in the main body 138 to mount and secure the stublet preform 300 to the main body 138 of the shaft 120. The particular thread configuration for the engagement between the threaded portions 210 and 310 may be selected to ensure proper engagement of the two components under harsh operating conditions without loss of engagement torque. For example, the threads can be formed using a Spiral Lock® arrangement, thread locking compound may also be added, or the like.

The internal part 302 further includes a tapered portion 312, which as shown in the embodiment illustrated in FIG. 5 has a frusto-conical profile that extends at an angle, a, between a smaller diameter 314 adjacent the threaded portion 310 to a larger diameter 316. The larger diameter 316 is placed away from the threaded portion 310 and defines the transition between the internal and external parts 302 and 304. As can be seen in FIG. 7, an outer dimension of the larger diameter 316 is selected to mate with an inner diameter of the entry portion 208 of the bore 206 at least in a location adjacent the annular end surface 204 such that a close fit can be achieved along an area 318 lying around an interface between the larger diameter 316 and the entry opening of the entry portion 208. The close fit around the area 318 helps align the stublet preform 300 with the main body 138 and also support the alignment against bending moments applied in the radial direction during operation. Any empty spaces 320 adjacent and within the blind end 214 and also between the tapered portion 312 and the tapered bore 208, if any, may be filled with a material, for example, a high-temperature epoxy and/or a thread locking compound, to further consolidate the mechanical connection between the stublet preform 300 and the main body 138 of the shaft 120.

Figure 8:
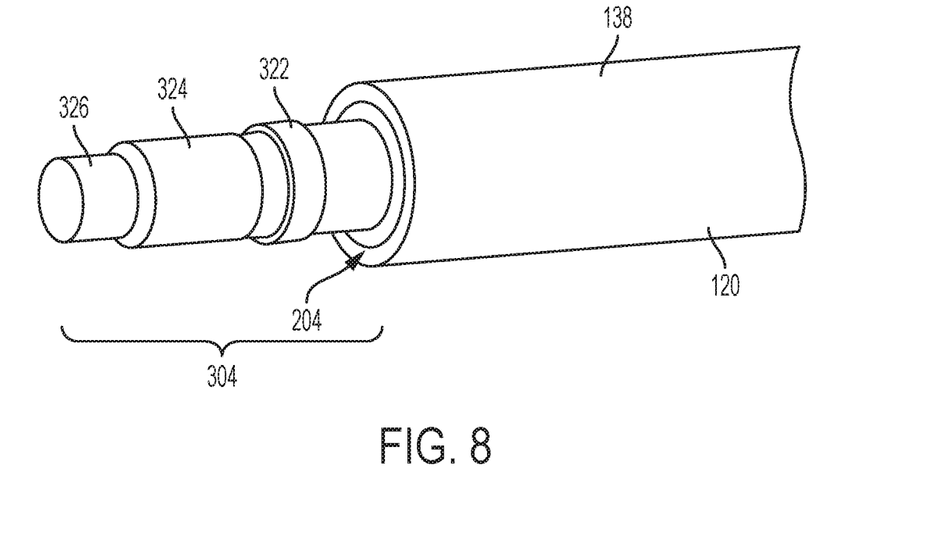
FIG. 8 is a partial view of a threaded insert installed onto the end of the shaft shown in FIG. 4 in accordance with the disclosure.
Figure 9:
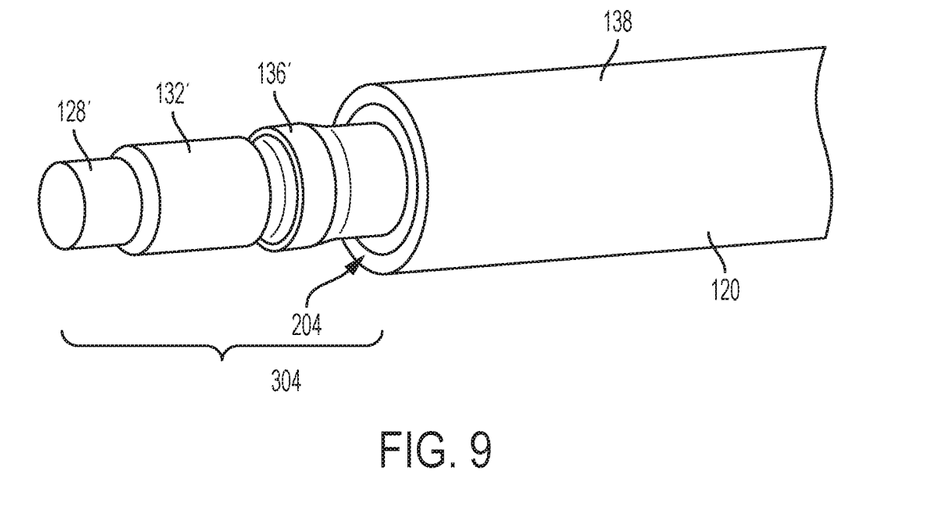
FIG. 9 is a detail view of the threaded insert after a finishing operation in accordance with the disclosure.

When the stublet preform 300 is first installed onto the end of the shaft 120, certain functional surfaces on the external part 304 may remain unfinished. For example, a bearing preform 322, a thread preform 324, and a pilot preform 326 may exist in the protruding external part 304 so they can be machined later to ensure that proper tolerances with respect to remaining features of the shaft 120 are achieved or maintained. These preform features, which are also shown in FIG. 8, are machined, for example, on a lathe or a computer controlled machining setup, such that the bearing preform 322 forms a remanufactured bearing 136', the thread preform 324 forms a thread portion 132' and the pilot preform 326 forms the pilot portion 128' on the new, external part 304 of the shaft 120.

INDUSTRIAL APPLICABILITY

The present disclosure is applicable to shafts used in turbochargers to connect the turbine wheel with the compressor wheel. In the described embodiment, the compressor end of the shaft is discussed, but it should be appreciated that the same or similar processes can be used on the turbine side of the shaft to repair and replace mounting features for the turbine wheel. The remanufacturing method includes removing a damaged end of the shaft and creating a threaded bore in its place. A preform is installed into the bore, and a finishing machine operation may be performed to recreate the mounting features of the shaft.

Figure 10:
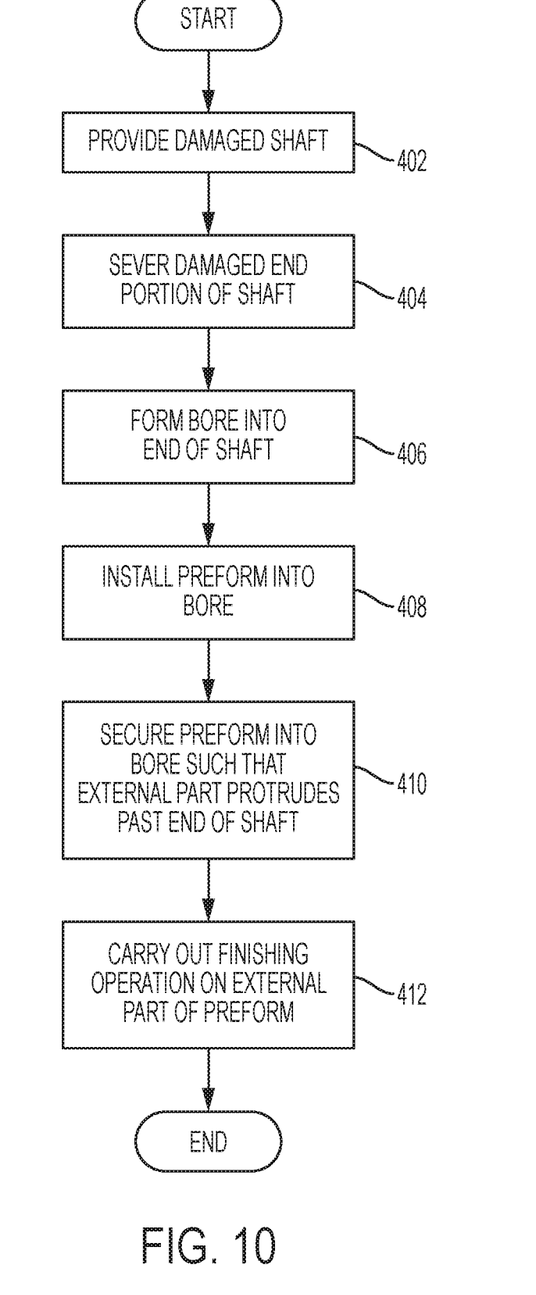
FIG. 10 is a flowchart for a method of remanufacturing a compressor end of a turbocharger shaft in accordance with the disclosure.

A flowchart for a method of remanufacturing a compressor shaft is shown in FIG. 10. A damaged shaft is provided at 402, and a damaged end-portion of the shaft is severed at 404. A bore is formed into the end of the shaft at 406, and a preform is installed at 408. The bore may include a tapered portion that mates with a corresponding tapered portion of the bore. In an alternative embodiment, the bore may be a straight or stepped bore that matingly engages a cylindrical segment of the insert. The preform is secured to the shaft at 410 and a finishing operation is carried out at 412 to form various mounting features on a protruding end of the preform.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A turbocharger, comprising:
   a center housing;
   a turbine connected on one side of the center housing, the turbine including a turbine wheel connected to a shaft, the shaft extending through the center housing;
   a compressor connected on an opposite side of the center housing, the compressor including a compressor wheel connected to the shaft opposite the turbine wheel, the compressor wheel including a threaded opening that terminates into a blind pilot bore;
   the shaft including:
   a body having a centerline,
   a bore extending into the body adjacent the compressor wheel,
   a stublet having an internal end engaged in the bore, and an external end connected to the compressor wheel;
   wherein the external end includes a threaded portion disposed adjacent the internal end, and a pilot diameter disposed on a distal end of the external end of the stublet, and
   wherein the threaded portion threadably engages the threaded opening, and the pilot diameter slidably engages the blind pilot bore at a close fit to align the compressor wheel with the shaft.

2. The turbocharger of claim 1, wherein the bore is a tapered bore including an entry portion and a threaded portion disposed adjacent the entry portion opposite the compressor wheel.

3. The turbocharger of claim 2, wherein the stublet further includes a tapered portion disposed between the internal and external ends, the tapered portion having a smaller diameter adjacent the internal end and a larger diameter adjacent the external end.

4. The turbocharger of claim 3, wherein the larger diameter has a close fit with an internal diameter of the entry portion.

5. The turbocharger of claim 1, wherein the internal end further includes a conical tip that matingly engages a blind conical end of the bore.

6. The turbocharger of claim 1, wherein the internal end of the stublet threadably engages the bore, and wherein the threadable engagement includes a thread locking feature.

7. A turbocharger, comprising:
a center housing;
a turbine connected on one side of the center housing, the turbine including a turbine wheel connected to a shaft, the shaft extending through the center housing;
a compressor connected on an opposite side of the center housing, the compressor including a compressor wheel connected to the shaft opposite the turbine wheel;
one of the turbine wheel and the compressor wheel including a threaded opening that terminates into a blind pilot bore;
the shaft including:
a body having a centerline,
a bore extending into the body adjacent the one of the turbine wheel and the compressor wheel,
a stublet having an internal end engaged in the bore, and an external end connected to the one of the turbine wheel and the compressor wheel;
wherein the external end includes a threaded portion disposed adjacent the internal end, and a pilot diameter disposed on a distal end of the external end of the stublet, and
wherein the threaded portion threadably engages the threaded opening, and the pilot diameter slidably engages the blind pilot bore at a close fit to align the one of the turbine wheel and the compressor wheel with the shaft.

8. The turbocharger of claim 7, wherein the bore is a tapered bore including an entry portion and a threaded portion disposed adjacent the entry portion opposite the one of the turbine wheel and the compressor wheel.

9. The turbocharger of claim 8, wherein the stublet further includes a tapered portion disposed between the internal and external ends, the tapered portion having a smaller diameter adjacent the internal end and a larger diameter adjacent the external end.

10. The turbocharger of claim 9, wherein the larger diameter has a close fit with an internal diameter of the entry portion.

11. The turbocharger of claim 7, wherein the internal end further includes a conical tip that matingly engages a blind conical end of the bore.

12. The turbocharger of claim 7, wherein the internal end of the stublet threadably engages the bore, and wherein the threadable engagement includes a thread locking feature.

* * * * *